United States Patent
Wolde (10) Patent No.: US 8,881,329 B2
(45) Date of Patent: Nov. 11, 2014

(54) EASY TO CHANGE AUTOMOBILE TIRES

(71) Applicant: Dibu Wolde, East Hampton, CT (US)

(72) Inventor: Dibu Wolde, East Hampton, CT (US)

(*) Notice: Subject to any disclaimer, the term of this patent is extended or adjusted under 35 U.S.C. 154(b) by 0 days.

(21) Appl. No.: 13/847,250

(22) Filed: Mar. 19, 2013

(65) Prior Publication Data
US 2014/0283310 A1   Sep. 25, 2014

(51) Int. Cl.
*B25F 1/00*   (2006.01)

(52) U.S. Cl.
USPC ................................................ 7/100

(58) Field of Classification Search
USPC .............. 7/100; 254/418, 424, 216; 81/57.22, 81/426, 180.1
See application file for complete search history.

(56) References Cited

U.S. PATENT DOCUMENTS

| | | | | |
|---|---|---|---|---|
| 849,439 | A * | 4/1907 | Thompson | 81/75 |
| 4,103,869 | A * | 8/1978 | Mesny et al. | 254/425 |
| 6,134,989 | A * | 10/2000 | Stevens | 81/57.22 |
| 6,305,245 | B1 * | 10/2001 | Kress | 81/57.22 |
| 7,121,175 | B2 * | 10/2006 | Anderson | 81/462 |
| 8,112,837 | B1 * | 2/2012 | Lopez | 7/100 |

* cited by examiner

*Primary Examiner* — Hadi Shakeri (57) ABSTRACT

Apparatus for installing and removing road wheels from a motor vehicle, which may include a powered jack permanently mountable to the vehicle and a powered tool for tightening and loosening lug nuts and screws. The jack is an assembly incorporating two screw operated jacks, each for lifting one corner of the vehicle. The jack may include a manual controller having a power cord which is inserted into the cigarette lighter socket of the vehicle and which selectively operates any of up to four screw operated jacks. The powered tool may include plural sockets for engaging all lug nuts and screws simultaneously. The jack and powered tool may each have respective power cords which are insertable into the cigarette lighter socket or alternatively into a power port of the manual controller. The invention may comprise a kit including one or more jacks, the powered tool and optionally a jack stand.

5 Claims, 7 Drawing Sheets

EASY TO CHANGE AUTOMOBILE TIRES

CROSS-REFERENCE TO RELATED APPLICATIONS

This application claims priority to U.S. Provisional Utility Application Ser. No. 61/685,833 filed Mar. 27, 2012, the contents of which are incorporated by this reference.

FIELD OF THE INVENTION

The present invention relates to apparatus for assisting in removing the wheel of a vehicle, and more particularly, to accessories such as a motorized jack system which is atttachable to the vehicle and to a wrench system for loosening and tightening lug nuts and screws.

BACKGROUND OF THE INVENTION

Motorists must occasionally remove the wheels and tires of their vehicles for service. Tires may leak air or become punctured and need immediate replacement. This may occur in the course of driving to a destination. If there is no convenient commercial or other source of service to perform this task, then the motorist is obliged to undertake replacement his or her self.

Passenger vehicles such as automobiles and light trucks are typically delivered to the retail purchaser with a spare tire mounted on a wheel and tools such as a wheel wrench for removing lug nuts or screws, and a mechanical jack to lift the vehicle to provide necessary clearance to remove the failed tire and replace it with the spare tire.

Using these items may prove difficult. For one thing, these items are typically stored in the trunk of the vehicle. Should the trunk be filled with items being transported, retrieval of the jack and wheel wrench is time consuming. Should wheel replacement become necessary under adverse conditions such as inclement weather, darkness, and the like, the entire operation becomes increasingly difficult, time consuming, and objectionable. In particular, the old, the weak, and the infirm may possibly find wheel replacement to be beyond their immediate abilities.

The automobile industry has proposed onboard jacks to overcome the above noted problems. These systems typically require modification to conventional chassis and body designs. This idea, while appealing, has not met with general acceptance by vehicle buyers. Yet the idea remains appealing. Thus there exists a need to provide such amenities while not obliging motor vehicle manufacturers to customize their designs to accommodate an amenity which is not necessarily widely demanded.

SUMMARY OF THE INVENTION

The present invention addresses the above stated need by providing accessories to assist in removing and replacing wheels, which are readily permanently or temporarily installed on a vehicle in anticipation of replacing wheels.

In one aspect of the invention, the invention provides a jack system which is permanently mounted to the vehicle and very easily installed thereon. In another aspect of the invention, the invention provides a device for tightening and loosening lug nuts and screws, which is temporarily placed on the wheel to be removed. The device engages the failed tire and makes tightening and loosening of lug nuts and screws performed expeditiously and easily, with minimal exposure of the operator of the vehicle to contamination by dirt.

The jack system and the device for tightening and loosening lug nuts and screws are powered, preferably by connection to the existing electrical power system of the vehicle. These items may for example have power cords terminating in terminals which are matingly compatible with cigarette lighters. This is desirable since costs and complexity of power cords are minimized, while relying upon facile connection to an existing electrical power circuit which by its nature will support the amount of electrical power needed for powered tools of the sort described herein.

The jack system uses an enclosed duplex screw jack arrangement. Contained within a common housing, two screw jacks each connected to lifting legs are disposed in opposed directions. Such an assembly is installed for example below the chassis of the vehicle. The two screw jacks is powered by individual or dedicated motors. Each motor is selectively operated to raise and lower the vehicle by a hand held controller. Raising and lowering of the vehicle may therefore be accomplished without obliging the operator of the vehicle to retrieve and install a jack.

The device for tightening and loosening lug nuts and screws are adapted to engage all lug nuts or screws simultaneously for tightening and loosening. The accessories may include a hand held powered wrench which may directly be placed on individual lug nuts or screws if desired, or which alternatively may engage a bolt head which is part of the device for tightening and loosening lug nuts and screws and thereby provide power to remove and install all of the lug nuts or screws simultaneously. The automatic wrench uses quick-change plates and sockets to accommodate all vehicle bolt patterns and lug nut sizes.

This device may have collapsible arms which close over the failed tire to secure the interchangeable head plates in place while the tire is being removed or installed. The device may fold for compact stowage.

It is an object of the invention to assist a vehicle operator in removing and replacing wheels and tires for service, while relieving the vehicle operator of the necessity of exerting potentially significant bodily effort and while protecting the vehicle operator from undesired contact with road wheels.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
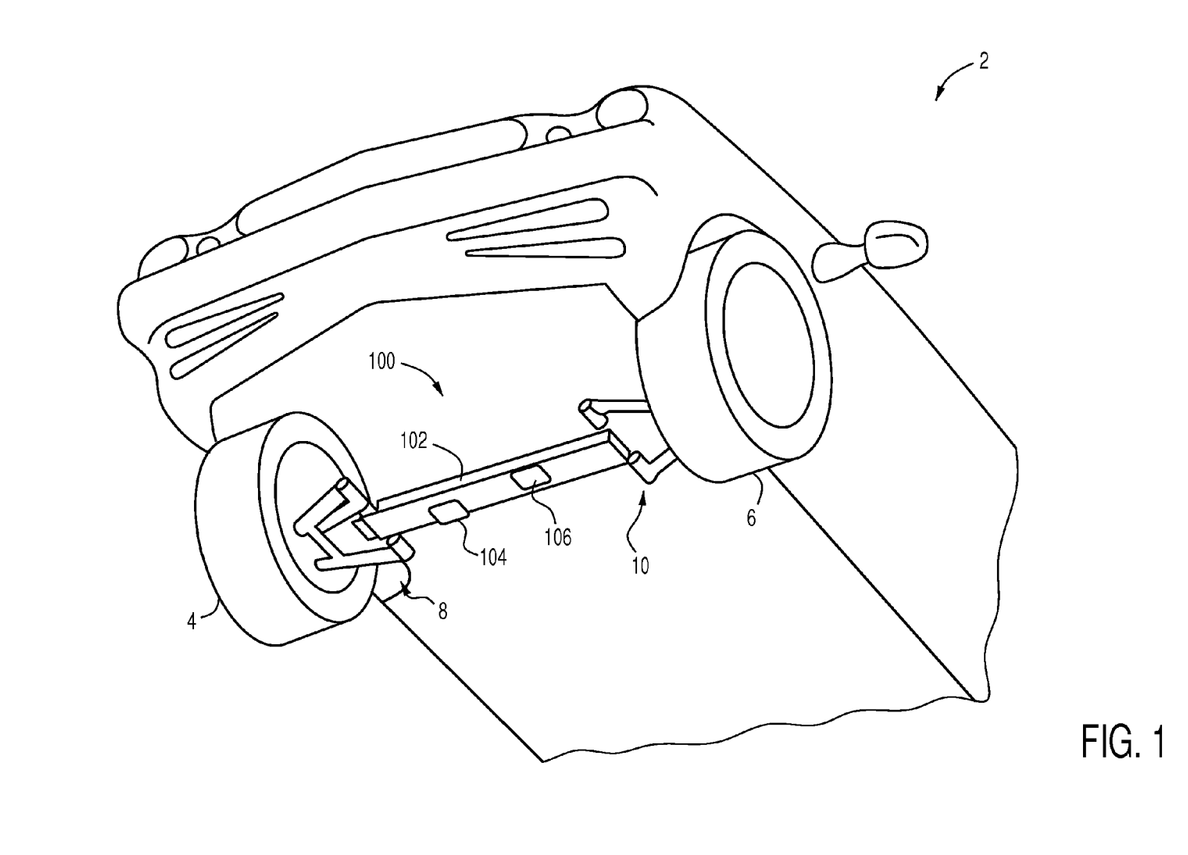
FIG. 1 is a diagrammatic environmental bottom perspective view of a motor vehicle having a powered jack mounted thereto, the powered jack shown in the fully retracted condition.
Figure 2:
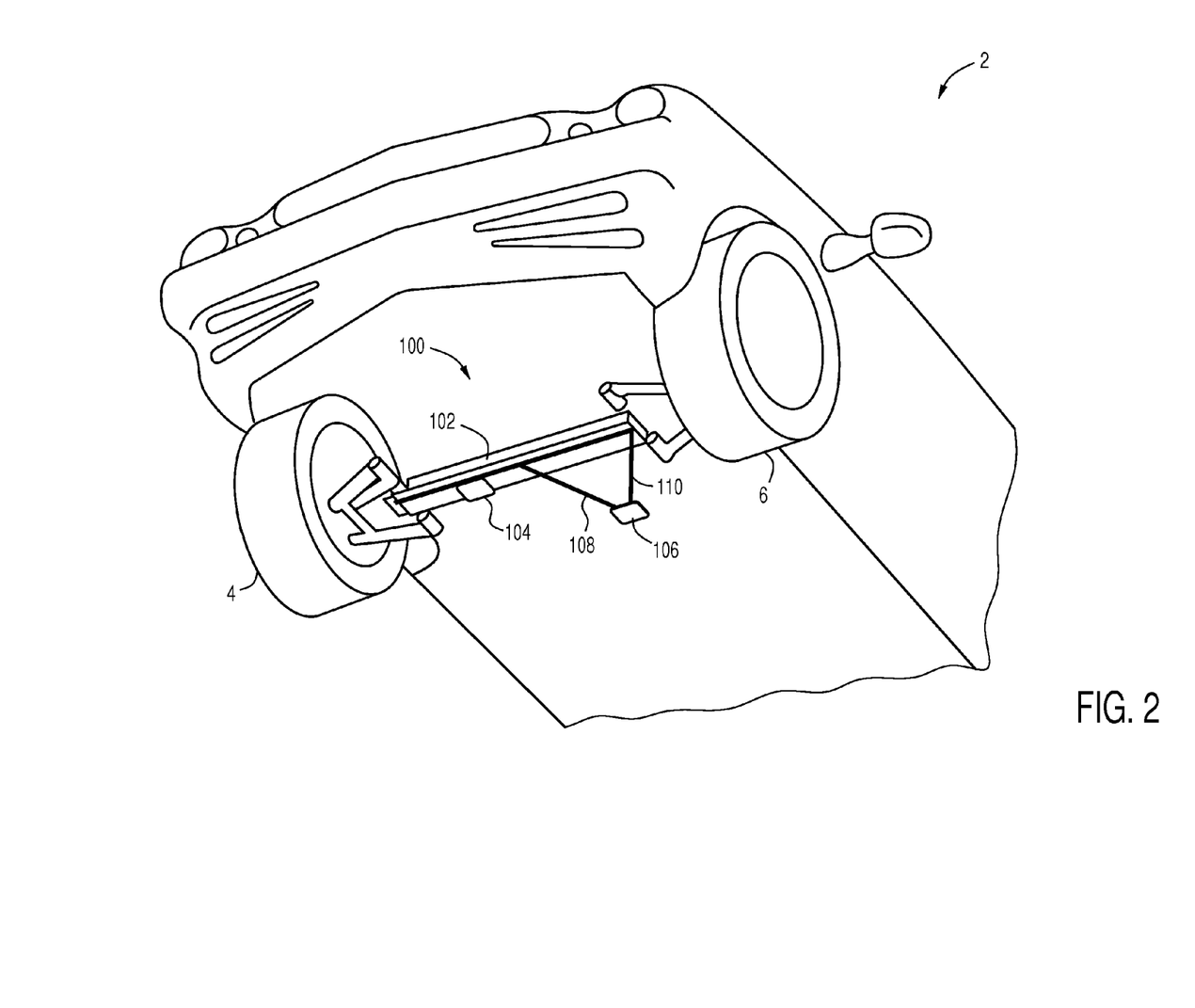
FIG. 2 is similar to FIG. 1, but shows the jack in the extended or deployed position.

Referring first to FIGS. 1 and 2, according to at least one aspect of the invention, there is shown a powered jack 100 which is capable of being mounted to the body of a motor vehicle 2 and operated or powered from the electrical system of the motor vehicle 2. The powered jack 100 has the function of assisting the operator of the motor vehicle 2 to raise the motor vehicle 2 above the ground (not shown) on which the motor vehicle 2 rests to replace a defective tire for example, and subsequently to lower the motor vehicle 2 to the ground.

In FIG. 1, the powered jack 100 spans the two front wheels 4, 6 of the motor vehicle 2, and slightly covers the respective A-arms 8, 10. As employed herein, the terms "wheel" and "tire" will be used interchangeably unless context clearly dictates otherwise.

The powered jack 100 is shown only representatively, with only a housing 102 and two feet 104, 106 being visible at the underside of the motor vehicle 2.

It should be noted at this point that orientational terms such as underside refer to the subject drawing as viewed by an observer. The drawing figures depict their subject matter in orientations of normal use, which could obviously change with changes in position of the described item or its environment. Therefore, orientational terms must be understood to provide semantic basis for purposes of description, and do not limit the invention or its component parts in any particular way.

Other components of the powered jack 100 will be shown in other Figures and described hereinafter. FIG. 2 shows the powered jack 100 in an extended or deployed condition for lifting the motor vehicle 2 above the ground. In the deployed condition, the foot 106 projects sufficiently from the housing 102 to lift the motor vehicle 2, while the foot 104 remains retracted to the housing 102. This would be performed by an operator of the motor vehicle 2 should the wheel 6 need removal. The foot 106 is pivotally connected to a first arm 108 and pivotally connected to a second arm 110. The first arm 108 is pivotally connected to a traveler block which travels along a jack screw (see FIG. 3), while the second arm 110 is pivotally connected to the housing 102 at one end and to the foot 106 at the other end.

Figure 3:
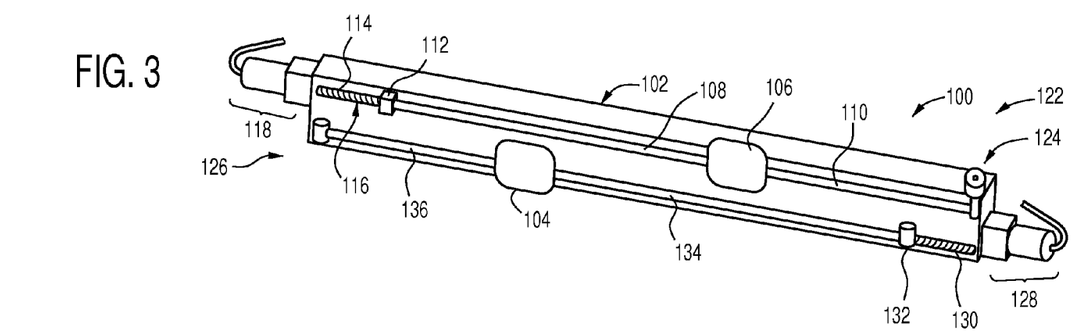
FIG. 3 is a perspective view of the powered jack, reflecting the view seen in FIG. 1, but drawn to greater scale and showing more detail.
Figure 4:
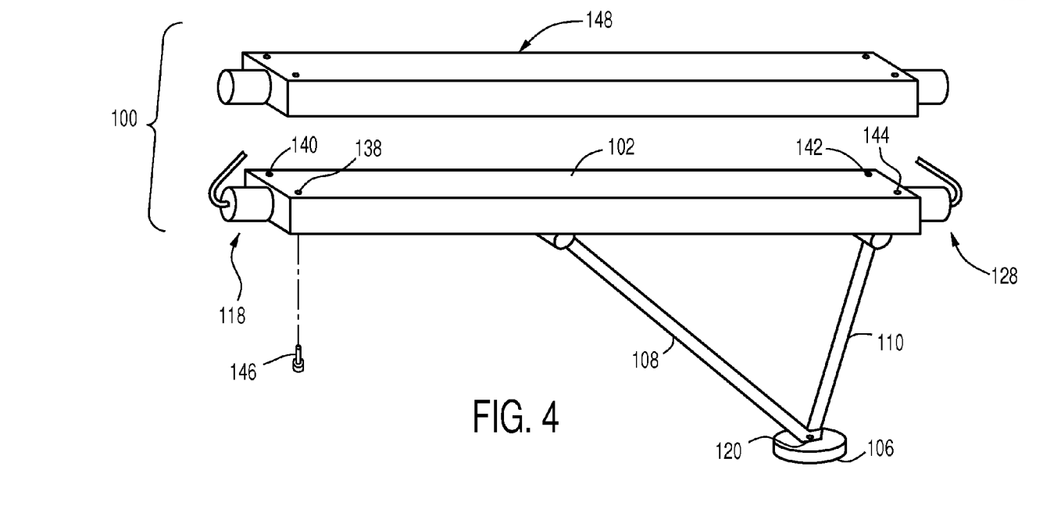
FIG. 4 is an exploded upper perspective view of the jack of FIG. 3, but showing a deployed condition.

As seen from FIGS. 3 and 4, the leg 108 engages a traveler block 112 which may have female threads (not visible in FIG. 3) which are matingly compatible with the external threads 114 of a jack screw 116. The traveler block 112 is regarded as a nut which rides on the jack screw 116 when the latter is rotated. Rotation is induced by a gearmotor 118. When the gearmotor 118 rotates the jack screw 116 in one direction, the traveler block 112 advances in one direction. The jack screw 116 has a rotational axis oriented along the length of the jack screw 116. This is conventional, and need not specifically be called out. When the gearmotor 118 rotates in the opposite direction, the traveler block advances in an opposed second direction. As the traveler block 112 moves along the jack screw 116, the anchorage point of the arm 108 moves, and the leg 108 projects progressively from the housing 102, or in the case of opposite direction of rotation of the jack screw 116, is progressively retracted towards or into the housing 102. Pivotal connection of the arm 108 at the traveler block 112 and at a point of anchorage at the foot 106 enables the arm 108 to move to the extended or deployed position seen in FIG. 4. The arm 110 moves responsively to movement by the arm 108, similarly projecting progressively from the housing 102 when the jack screw 116 is rotated in the first direction and to be progressively retracted into the housing 102 when the jack screw 116 is rotated in the opposed second direction.

The gearmotor 118, the jack screw 116, the traveler block 112, the legs 108 and 110, the foot 106, and other minor elements necessary to effect operation as described, such as an axle 120 located at the distal end of the leg 108, which enables the legs 108, 110 to remain pivotally connected during extension of the legs 108, 110, are regarded as a screw jack assembly 122. The leg 110 may have a pivotal anchorage secured to the housing 102, indicated as an axle 124, which will be understood to be suitably journaled to the housing 102. Similarly, the leg 108 will have a pivotal connection (not shown in detail) at the traveler block 112.

The foot 104 is associated with a screw jack assembly 126, which may include a gearmotor 128, a jack screw 130 rotatably driven by the gearmotor 128, a traveler block 132, a first arm 134, and a second arm 136. The screw jack assembly 126 is the structural and functional equivalent of the screw jack assembly 122.

The screw jack assemblies 122, 126 are seen to be arranged parallel to one another, as this refers to the respective axes of rotation of the respective jack screws 114, 130, but face in opposed directions as they are mounted within the housing 102. This arrangement imparts compactness to the powered jack 100, while resulting in a module which is readily adaptable to the purposes of the present invention. Notably, two powered jacks each of which are the structural and functional equivalent of the powered jack 100 (although the jacks need not necessarily be identical) is provided on one motor vehicle such as the motor vehicle 2, with one powered jack located at each axle (not shown) of the motor vehicle. This will result in one jack being provided for each wheel which may possibly require lifting for removal and replacement.

As shown in FIG. 4, the housing 102 may have a plurality of holes 138, 140, 142, 144. The hole 138 is provided with a screw 146 or other fastener which passes through the hole 138 and engages the body of the motor vehicle 2. The screw 146 is shown only representatively, and is understood to include washers and other apparatus (not shown) where good practice dictates. The holes such as the hole 136, with associated fasteners such as the screw 146, is regarded as mounting apparatus for mounting the housing 102 permanently although removably to the motor vehicle 2. In some vehicles, screw mounting is feasible. In other vehicles (not shown), other arrangements are preferred. Illustratively, the housing 102 could be provided with tabs (not shown) or other mounting features to suit under chassis conditions of different models of vehicles.

It is mentioned here that although gearmotors 118, 128 are shown and described, other arrangements may be substituted. It is merely necessary to connect a motor operably to a jack screw such as the jack screws 114, 130 in a manner enabling the motor to rotate the jack screw about the rotational axis.

FIG. 4 also shows a non-metallic protective cover 148 which is dimensioned and configured to be able to cover the housing 102 in close cooperation therewith. The protective cover 148 is made from a flexible, preferably water impermeable natural or synthetic material such as a plastic or rubber, or silicone, or the like. The protective cover 148 excludes water from the inner workings of the powered jack 100 to the extent feasible. The protective cover 148 is optional as protective features are made integrally with the housing 102 if desired.

The electrical system of the powered jack 100 may include a manual controller enabling the operator of the motor vehicle 2 to selectively operate the first and second screw jack assemblies 122, 126, and two additional screw jack assemblies (not shown, but which are structural and functional equivalents of the screw jack assemblies 122, 126) to raise the motor vehicle 2 above the ground and to lower the motor vehicle 2 to the ground. This is done selectively at any corner of the motor vehicle 2 by operating the appropriate screw jack assembly, such as the screw jack assembly 122.

Figure 5:
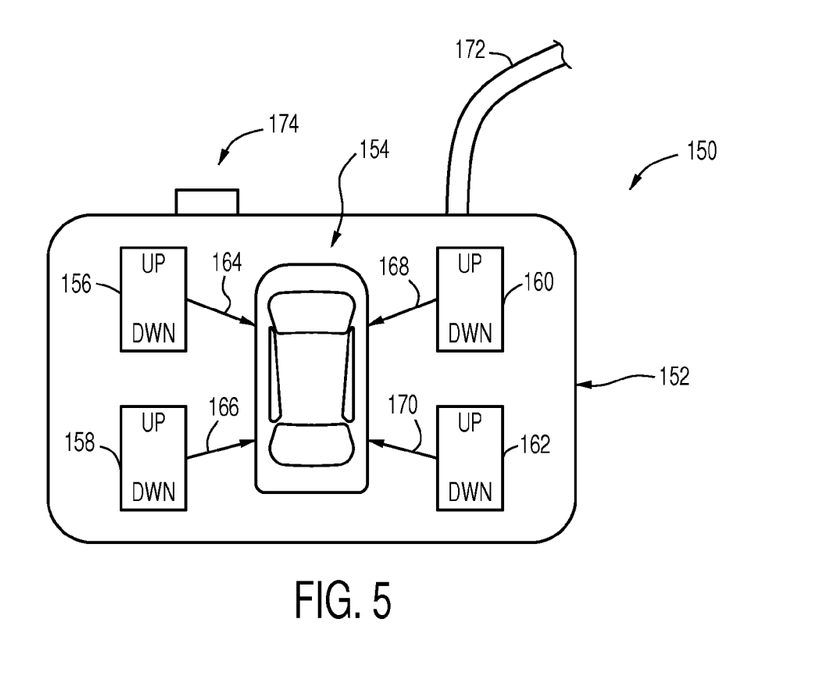
FIG. 5 is a diagrammatic plan view of a manual controller which is used to control the jack of FIG. 1.

As seen in FIG. 5, the manual controller may include a mobile, hand held control panel 150 comprising a housing 152 bearing a graphic representation 154 of a motor vehicle representing the motor vehicle 2. The control panel 150 may include four pushbuttons 156, 158, 160, 162 which are operable to operate four jack screw assemblies such as the first screw jack assembly 122, the second screw jack assembly 126, and two additional screw jack assemblies (not shown). The pushbuttons 156, 158, 160, 162 are of the rocker type. That is, depressing the upper end of a pushbutton 156, 158, 160, or 162 may cause the screw jack assembly associated with that pushbutton to raise the motor vehicle 2, while depressing the lower end of the pushbutton may lower the motor vehicle 2. Of course, other operator arrangements are utilized, such as dedicated pushbutton operators, a touchscreen control, a toggle switch, a joystick controller, a dial or other rotary operator, and still others (none shown).

It will be appreciated that a graphic indicator such as arrows 164, 166, 168, 170, which are indicative of which screw jack assembly (such as the screw jack assembly 122) is operated by which manual control operator (such as the pushbutton 156).

FIG. 5 shows a further feature of the control panel 150, notably, a power cord or cable 172. The power cord 172 may bring power from the electrical system of the motor vehicle 2 to the control panel 150 and to the powered jack 100 (and of course to a second powered jack where a total of four screw jack assemblies such as the screw jack assembly 122 are provided). The power cord 172 will be understood to include the necessary number of electrical conductors required to accomplish the functions described herein. The power cord 172 may have a terminal (not shown) which is capable of completing a power circuit when inserted into a cigarette lighter socket (not shown) of the motor vehicle 2. This is a commonly practiced expedient for supplying electrical power to accessories for motor vehicles, and need not be fully detailed herein. However, the terminal is similar to that shown in FIG. 6. The electrical circuitry of the control panel 150 may also have a power port 174 which is electrically connected to the power cord 172 and which is disposed to make power obtained from the power cord 172 available to energize external devices having electrical terminals compatible with the power port 174. An example of such an external device, shown in FIG. 9, will be described hereinafter.

Figure 6:
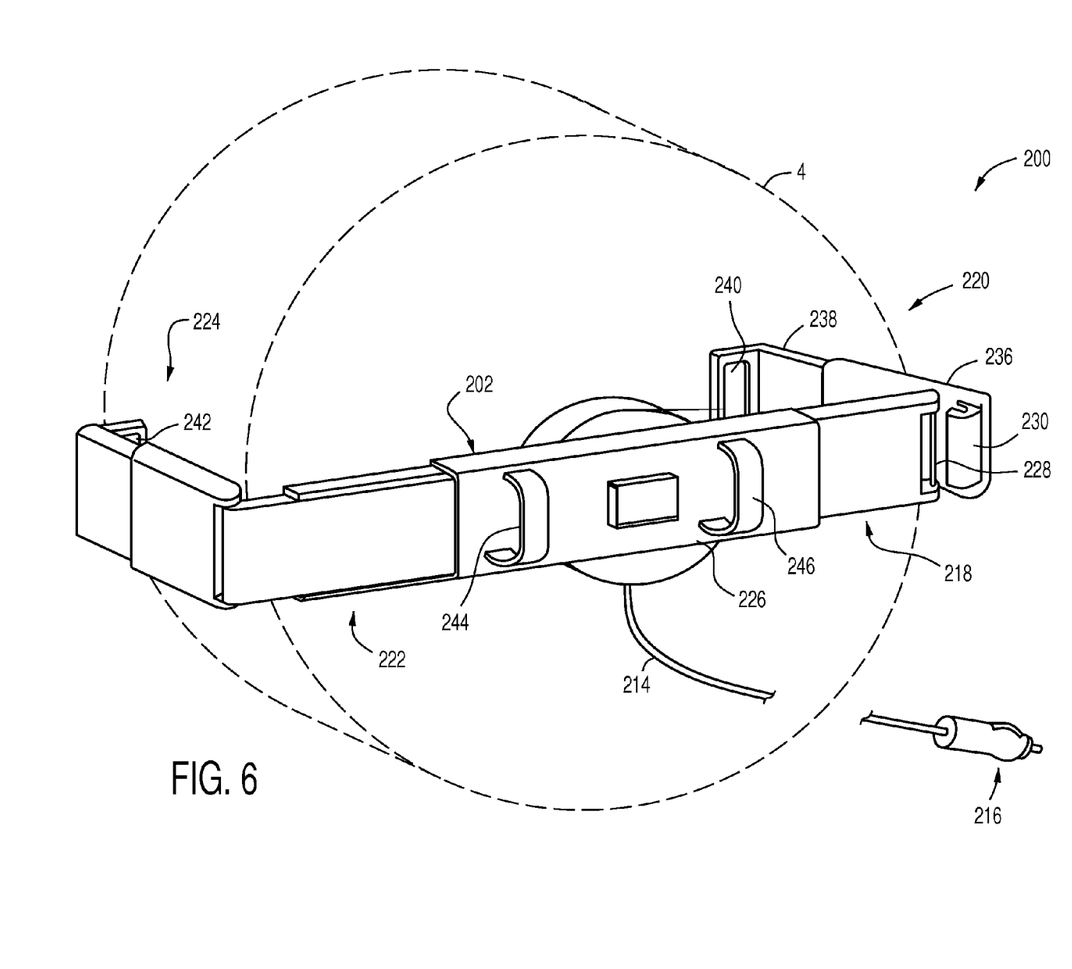
FIG. 6 is an environmental perspective view of a lug nut removing and installing tool according to a further aspect of the invention.
Figure 7:
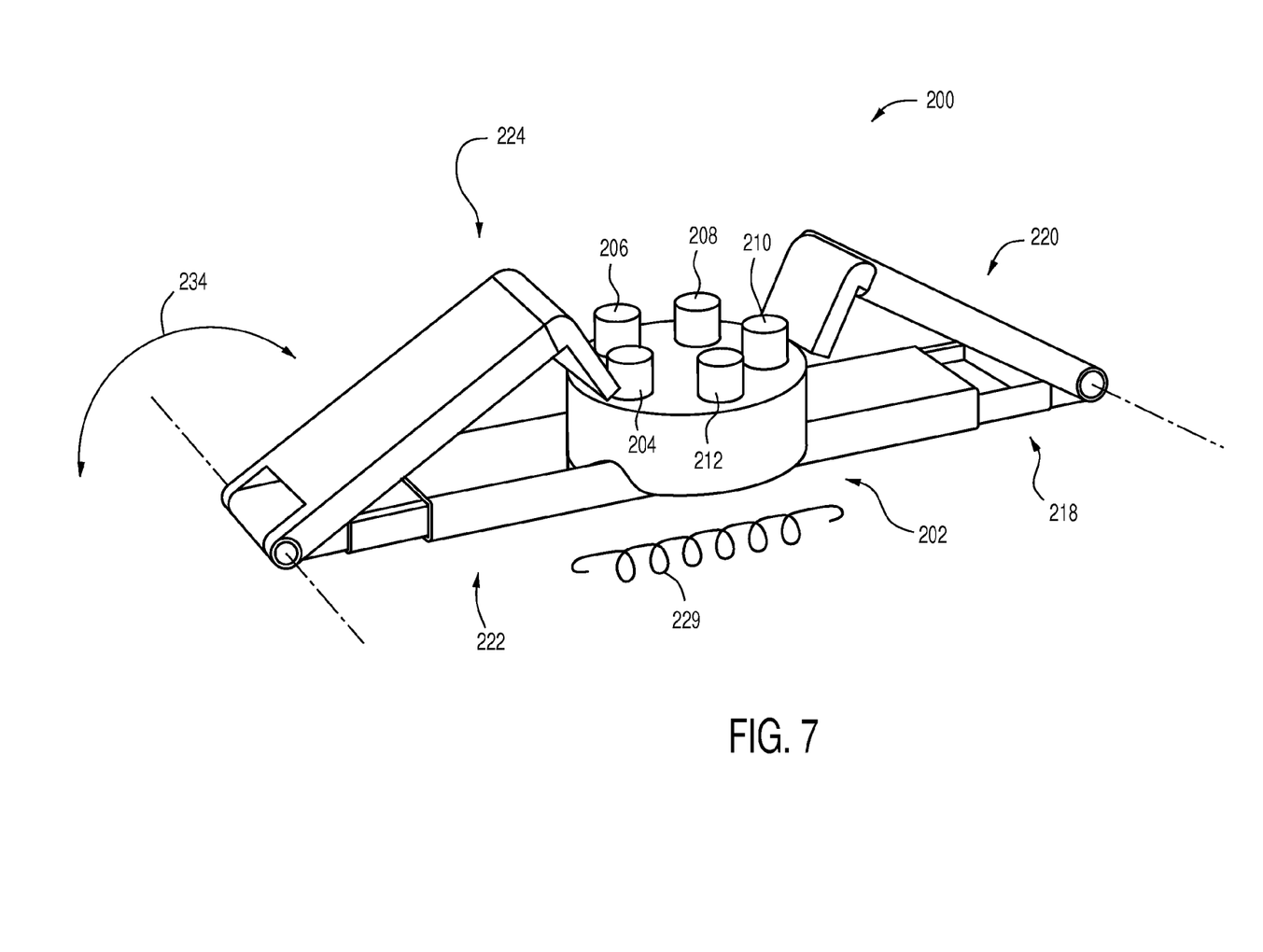
FIG. 7 is a perspective view showing that side of the lug nut removing and installing tool which is concealed in FIG. 6.

Referring now to FIGS. 6 and 7, in another aspect of the invention, there is shown a powered lug threading tool 200 which is disposed to tighten and loosen lug nuts and screws (not shown) of a wheel such as the wheel 4 of a motor vehicle such as the motor vehicle 2 of FIG. 1. The lug threading tool 200 may comprise a frame 202 or an equivalent structural enclosure supporting a plurality of drive sockets 204, 206, 208, 210, 212 mounted to the frame 202. In the example of FIG. 7, five drive sockets 204, 206, 208, 210, 212 are shown; however, this number is varied such that the number of sockets is equal to the number of lug nuts or screws for any motor vehicle to be served by the powered lug threading tool 200. The invention has interchangeable heads, which uses quick-change plates and sockets to accommodate all vehicle bolt patterns and lug nuts sizes. See FIG. 9

Figure 9:
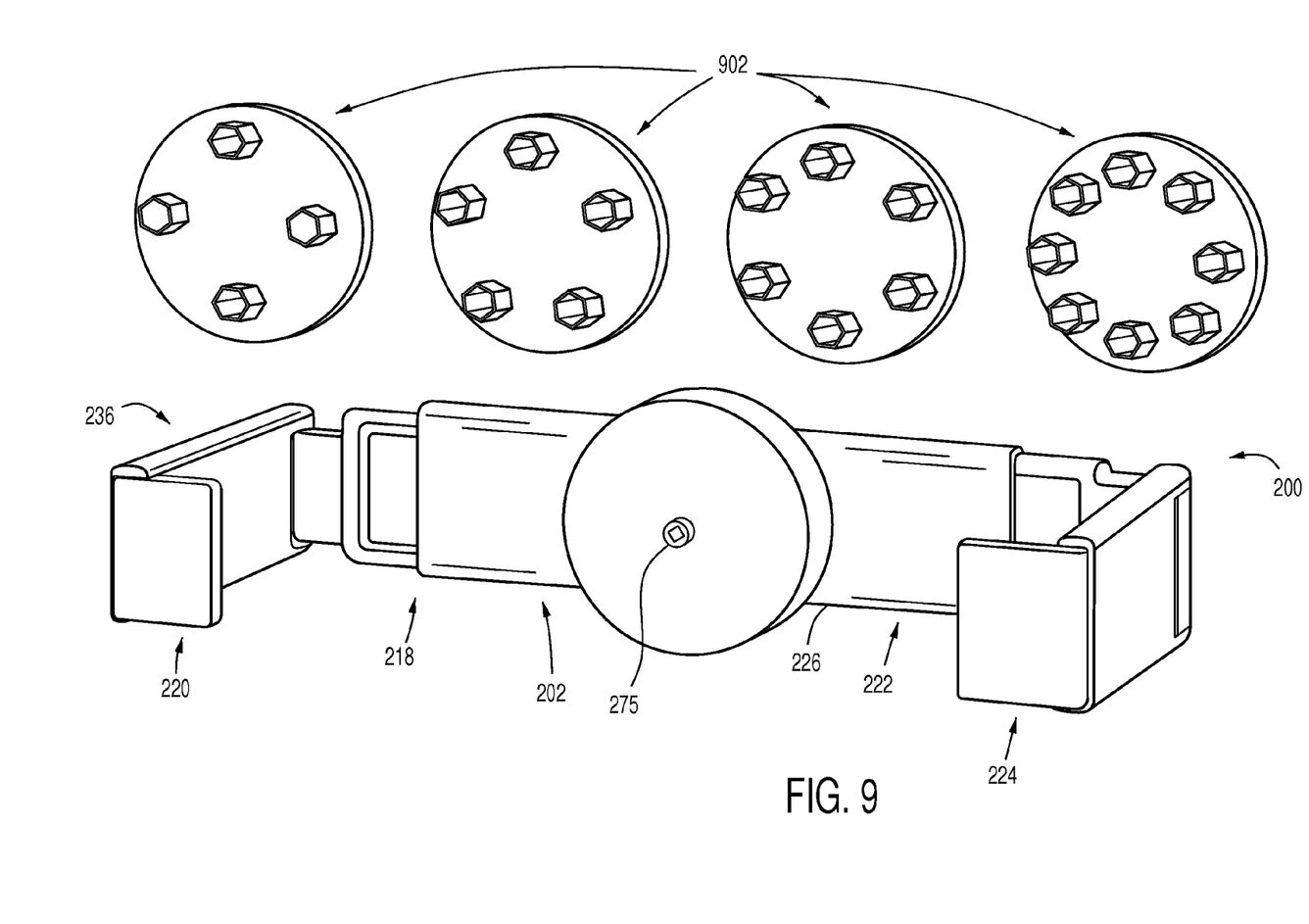
FIG. 9 is a perspective view of the interchangeable heads which is an optional component of the invention.

As shown in FIG. 9, the powered lug threading tool 200 has sockets in different sizes to fit all lug nuts. These different sockets include several interchangeable heads 902. As shown in FIG. 9 as a non-limiting example, the interchangeable head 902 can have four, five, six, or eight different sockets to accommodate different lug nut patterns found in vehicles. In addition, the user can order several interchangeable heads 902 in order to accommodate the different vehicle lug nut patterns that the user can own or they can just order just one interchangeable head 902 for their sole personal vehicle. Moreover, as a non-limiting example, the interchangeable heads 902 can be attached to the powered lug threading tool 200 by the use of a screw and bolt, a sliding mechanism, locking mechanism, or can even be factory installed and factory removed.

Enclosed within the frame 202 is a common drive (not visible in FIGS. 6 and 7) which rotates all of the drive sockets 204, 206, 208, 210, 212 in the same direction when the common drive is rotatably driven. The common drive may comprise a gearmotor (not shown) including a motor which is disposed to rotatably drive the common drive, and a suitable gear drive arrangement such as a planetary gearset to transfer rotation from the output shaft of the motor to each of the several drive sockets 204, 206, 208, 210, 212. Such gear drive arrangements are well within the understanding of those skilled in the art, and need not be set forth in greater detail herein.

The lug threading tool 200 may include a clamp disposed to engage a wheel of the motor vehicle 2, such as the wheel 4. The lug threading tool 200 may therefore be self-supported on the wheel 4 after installation. The lug nuts or screws of the motor vehicle 2 are simultaneously loosened and tightened without obliging the operator of the motor vehicle 2 to use his or her hands, apart from manipulating controls by finger, as will be detailed hereinafter. The motor providing power for the lug threading tool 200 is preferably an electric motor operable from the electrical system of the motor vehicle 2. To that end, the lug threading tool 200 may comprise a power cord 214 (shown only in FIG. 6) which is of course connected to the electric motor. The power cord 214 may have a terminal 216 which is capable of establishing electrical continuity with a power source. Preferably, and as illustrated in FIG. 6, the terminal 216 is dimensioned and configured to be capable of completing a power circuit when inserted into the cigarette lighter socket (not shown) of the motor vehicle 2. This arrangement is utilized for other power cords utilized in the present invention, such as the power cord 172 of FIG. 5.

As seen clearly in FIG. 6, the clamp may comprise a first arm 218 which projects from the frame 202 and includes a first hook 220 disposed to partially encircle the wheel 4. An opposed second arm 222 may project from the frame 202 in a direction opposite that of the first arm 218. The second arm 222 may include a second hook 224 disposed to partially encircle the wheel 4 from the side opposite that engaged by the first hook 220.

The first arm 218 and the second arm 222 may each be telescopically adjustable in length along the direction of projection from the frame 202. This is accomplished for example by forming the frame 202 to include a sleeve like member 226 which receives each of the first arm 218 and the second arm 222 slidably in close cooperation therewith.

Preferably, and referring to FIG. 7, the first arm 218 and the second arm 222 are urged towards one another in order to effectively engage the wheel 4. This is accomplished by using a spring arrangement which may for example include a spring 229 which is connected to the first arm 218 and the second arm 222 in a manner disposed to draw the first arm 218 towards the second arm 222. Therefore, grip of the wheel 4 by the first hook 220 and the second hook 224 is increased. It should be mentioned here that the precise arrangement of the spring 229 is not critical to the invention. It is possible to provide the spring 229 as a tension spring, and to have hooks 230, 232 formed at the two ends of the spring 229 engage corresponding holes (not visible in FIG. 7) formed in the first arm 218 and the second arm 222.

The first hook 220 and the second hook 224 may each be pivotally connected to their respective first arm 218 and second arm 222 by a hinge joint. In FIG. 6, the hook 220 is shown spaced apart from its corresponding first arm 218. This enables the observer to discern a pivot axle 228 formed in the first arm 218 and a corresponding journal 230 formed in the hook 220 which may receive the pivot axle 228. The second hook 224 may enjoy similar construction but in mirror image for example. This hinged construction, wherein pivot or folding of the second arm 222 is indicated by an arrow 234, enables the lug threading tool to be folded from the deployed configuration depicted in FIG. 6 to a stowage configuration seen in FIG. 7. Obviously, the stowage configuration of FIG. 7 is more compact than is the case with the deployed configuration of FIG. 6.

It will also be seen by comparing FIGS. 6 and 7 that the hooks 220, 224 are telescopically adjustable in the direction corresponding to the width of the tire 4 from that surface of the tire 4 facing the center of the motor vehicle 2 to the opposed surface of the tire 4 which faces the outside of the motor vehicle 2. Telecopic adjustment is provided by forming the hook 220 in a first sleeve section 236 and a second section 238 which is slidably received within the sleeve section 236. A suitable detent (not shown) is provided to discourage unintended spreading or expanding of the hook 220. The hook 224 is similar in structure and function to the hook 220. Each hook 220 or 224 may comprise a resilient pad 240 or 242 disposed to engage the tire 4 and to enhance grip of the tire 4 by the respective hook 220 or 224. The pads 240, 242 are of rubber or another resilient material, and is formed with texture such as treads, ribs, or projections to further improve grip.

The lug threading tool 200 is maneuvered into place using handles 244, 246 which may project from the frame 202 as seen in FIG. 6.

The present invention is realized as a kit for installing and removing road wheels such as the wheel 4 from a motor vehicle such as the motor vehicle 4. Such a kit may comprise a first jack such as the powered jack 100, and a lug threading tool such as the lug threading tool 200. Preferably, such a kit would include a second jack, also similar to the powered jack 100. This would allow each of the corners of a motor vehicle to be raised independently, so as to serve any one failed tire.

Figure 8:
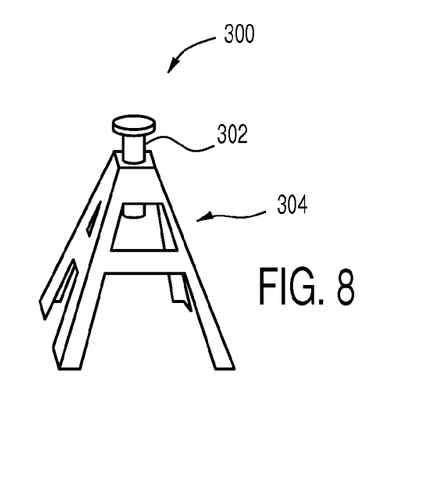
FIG. 8 is a perspective view of a jack stand which is an optional component of a kit realized in an aspect of the invention.

Optionally, the kit could include a jack stand such as the jack stand 300 seen in FIG. 8. As depicted in FIG. 8, the jack stand 300 is of the screw type, having a screw 302 which threads into a corresponding hole (not visible in FIG. 8) formed in the frame 304. Of course, other known types of jack stands may be substituted.

Optionally, the invention could include a storage case that would have sockets in different sizes to fit all lug nuts.

Optionally, the invention could include an automatically activating rotating beacon that would be located in the back of the automobile, and used to alert oncoming traffic to someone working on an automobile.

Optionally, the invention could have a jack stand that would have a fifteen second delay on it for lowering the automobile. This would prevent accidental lowering of the vehicle.

The present invention is susceptible to modifications and variations which may be introduced thereto without departing from the inventive concepts. For example, a powered jack such as the powered jack 100 is adapted to be mounted in locations other than directly beneath an axle as depicted. Powered jacks may for example be adapted to be mounted longitudinally on the vehicle body, for example, with one at the right side of the vehicle and the other at the left side. In such an example, each powered jack would raise and lower the front and rear corners of the same side of the vehicle.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible

I claim:

1. A kit for installing and removing road wheels from a motor vehicle, comprising:
 a first jack capable of being mounted to the body of the motor vehicle and operated from the electrical system of the motor vehicle, for assisting the operator of the motor vehicle to raise the motor vehicle above the ground on which the motor vehicle rests and to lower the motor vehicle to the ground, comprising:
 a housing having mounting apparatus for mounting the housing permanently to the motor vehicle;
 a first screw jack assembly and a second screw jack assembly each mounted within the housing and respectively comprising a jack screw having external threads and a rotational axis, a motor operably connected to the jack screw in a manner enabling the motor to rotate the jack screw about the rotational axis, a first arm drivably engaging the jack screw and disposed to project progressively from the housing when the jack screw is rotated in a first direction and to be progressively retracted into the housing when the jack screw is rotated in an opposed second direction;
 a second arm pivotally connected to the housing and disposed to project progressively from the housing when the jack screw is rotated in the first direction and to be progressively retracted into the housing when the jack screw is rotated in the opposed second direction;
 a foot which is pivotally connected to the first arm and the second arm and which contacts the ground below the vehicle when the first arm and the second arm project sufficiently from the housing, whereby the vehicle is lifted above the ground;
 an electrical system including a manual controller enabling the operator of the motor vehicle to selectively operate the first screw jack assembly and the second screw jack assembly to raise the motor vehicle above the ground and to lower the motor vehicle to the ground; and a lug threading tool disposed to tighten and loosen lug nuts and screws of the wheel of the motor vehicle, comprising a frame, a plurality of drive sockets mounted to the frame, a common drive which rotates all of the drive sockets in the same direction when the common drive is rotatably driven, a motor disposed to rotatably drive the common drive, and a clamp disposed to engage the wheel of the motor vehicle, whereby the powered lug threading tool is supported on the wheel, wherein the drive sockets may each engage one lug nut or screw of the wheel such that all of the lug nuts or screws are engaged and simultaneously loosened and tightened when the common drive rotates the drive sockets.

2. The kit of claim 1, further comprising a jack stand.

3. The kit of claim 1, wherein the motor of the lug threading tool is a gearmotor having an integral reduction gear operable to reduce the output rotational speed from the speed of the motor.

4. The kit of claim 1, further including an accessory comprising a hand held powered wrench to engage a bolt head which is part of the lug threading tool disposed to tighten and loosen lug nuts and screws and thereby provide power to remove and install all of the lug nuts or screws simultaneously.

5. The kit of claim 4, wherein the electrically powered socket wrench comprises a power cable having a terminal which is capable of completing a power circuit when inserted into a cigarette lighter socket of the motor vehicle.

* * * * *